United States Patent Office 3,253,992
Patented May 31, 1966

3,253,992
WATER DISPERSIBLE, ANHYDROUS, WATER INSOLUBLE VITAMIN PREPARATION AND AQUEOUS DISPERSIONS THEREOF
Gary Brooks, Rochester, N.Y., assignor to Eastman Kodak Company, Rochester, N.Y., a corporation of New Jersey
No Drawing. Filed Sept. 27, 1962, Ser. No. 226,750
15 Claims. (Cl. 167—81)

This invention relates to vitamins. More particularly, it relates to a water dispersible preparation of a normally water insoluble vitamin.

This invention is based on the discovery of an anhydrous, preparation of a water insoluble, fat-soluble vitamin, which preparation will disperse rapidly and easily in water to form a cloudy dispersion which is stable (does not cream out) for at least 30 minutes. The preparation consists essentially of a fat-soluble vitamin-active oil and an emulsifier composition.

This invention comprises this emulsifier composition. In addition, it comprises the anhydrous, water dispersible preparation. Also, it comprises an aqueous dispersion of the water dispersible preparation.

The emulsifier composition consists essentially of (A) polyoxyethylene (20) sorbitan monooleate and (B) a member of the group consisting of monoolein (the oleic acid monoester of glycerol) and a distilled monoglycerides product derived from safflower oil, the weight ratio of (A) to (B) being generally in a range from 1.5:1 to 4:1 and preferably in a range from about 1.8:1 to about 3:1.

Polyoxyethylene (20) sorbitan monooleate is a commercially available product. It is a polyoxyethylene adduct of sorbitan monooleate containing an average of about 20 molecular equivalents of ethylene oxide.

Monoolein is a commercially available product.

The distilled monoglycerides product derived from safflower oil is likewise a commercially available product. It has a total monoester content of at least 90% by weight. This product is made by the interesterification of glycerin with refined safflower oil followed by molecular distillation to concentrate the monoesters to at least the 90% value and to remove undesirable components. The product thus obtained has a monoester content of approximately 67% by weight glycerol monolinoleate, 27% by weight of glycerol monooleate and 6% by weight saturated monoglycerides. The product has an iodine value of 110–120, a congeal point of 25–28° C. and a clear point (it supercools readily) of 39–42° C. In addition, it usually contains small amounts of antioxidants. For cold room stability (lack of crystallization at 35° F.) of the anhydrous preparation of this invention as well as the aqueous dispersion thereof, it is preferred that the more saturated fatty acid fractions of this product be removed before incorporating it into the anhydrous preparation. Such can be done by wintering. One suitable procedure for wintering the distilled monoglycerides product consists of dissolving 1 part by weight of the product in 2 parts by weight of acetone, storing the resulting solution at −20° C. for 24 hours, filtering and then removing under vacuum the acetone from the thus wintered product.

The weight ratio of the components of the emulsifier composition is rather critical insofar as the anhydrous preparation of this invention is concerned. Thus, if in the composition the weight ratio of polyoxyethylene (20) sorbitan monooleate to the member of the group is about 1.5:1, the anhydrous preparations containing the composition disperse rapidly in water but the resulting aqueous dispersions are too unstable and "cream out" in less than 30 minutes. If in the composition the weight ratio of the polyoxyethylene (20) sorbitan monoleate to the member of the specified group is about 4:1, anhydrous preparations containing the composition tend to gel slightly when admixed with water, thus increasing the time for dispersion of the anhydrous preparation in the water. However, in this latter case, once the dispersion is formed, it has the desired stability.

The emulsifier composition is made by admixing the components at room temperature (20–25° C.).

The anhydrous preparation of this invention consists essentially of (1) a fat-soluble vitamin-active oil at a concentration in a range from about 25 to about 95% by weight of the preparation and (2) the emulsifier composition at a concentration in a range from about 5 to about 75% by weight of the preparation.

The fat-soluble vitamin-active oil consists essentially of at least one fat-soluble vitamin-active compound and an edible triglyceride oil. In some embodiments of this invention more than one fat-soluble vitamin-active compound are involved. Examples of a fat-soluble vitamin-active compound are the vitamin A esters such as vitamin A acetate, vitamin A palmitate and the like, and vitamin E compounds such as α-tocopherol, α-tocopheryl acetate and the like. Fat-soluble vitamin-active compounds are generally marketed in the form of edible oil concentrates. Usually these concentrates are so potent that in making up an anhydrous preparation of this invention with a much lesser potency, it is usually necessary to add to the concentrate an edible triglyceride oil, particularly a vegetable oil such as, for example, cottonseed oil, corn oil and the like, in order to bring the fat-soluble vitamin-active oil concentration of the anhydrous preparation into the range from about 25 to about 95% by weight of the preparation. Of course, it is within the scope of this invention to employ a pure fat-soluble vitamin-active compound in which case it is dissolved in a sufficient amount of an edible triglyceride oil to give a fat-soluble vitamin-active oil at a concentration within the specified range when admixed with the emulsifier composition. In this connection, however, it is required that the triglyceride oil concentration be at least about 5% by weight of the anhydrous preparation.

The anhydrous preparation can also contain other components at concentrations which do not adversely affect the water dispersibility properties of the preparation. For example, specific embodiments of the anhydrous preparation can include small concentrations of one or more preservatives such as antioxidants and the like.

The anhydrous preparation of this invention is made by thoroughly admixing the components thereof at room temperature (20–25° C.).

The anhydrous, fat-soluble vitamin-active preparation of this invention is used by admixing it at room temperature (20–25° C.) with water on either a continuous or batch basis and then adding the resulting aqueous dispersion as by continuous spraying or by batch application to animal and poultry feed, canned dog food, milk and the like. The water concentration or the concentration of the anhydrous preparation in the aqueous dispersion do not appear to be critical. Both depend somewhat on the desired vitamin potency of the aqueous dispersion. In general a concentration in a range from as low as 0.005 gram of anhydrous preparation per pound of water to as high as a 50:50 volume ratio is employed. Higher and lower concentrations can be used, however.

This invention is further illustrated by the following examples of various aspects thereof, including specific embodiments. This invention is not limited to these specific embodiments unless otherwise expressly indicated.

*Example 1*

This example illustrates a specific embodiment of an anhydrous, water dispersible vitamin A preparation.

This preparation is formulated to have a vitamin A potency of 100,000 U.S.P. units per gram.

The formulation of this embodiment is:

| Components: | Parts by weight |
|---|---|
| All-trans vitamin A palmitate concentrate (1,600,000 U.S.P. units per gram) | 6.5 |
| Cottonseed oil | 38.0 |
| Ethoxyquin | 0.5 |
| Polyoxethylene (20) sorbitan monooleate | 38.5 |
| Distilled monoglycerides product derived from safflower oil (Myverol Type 18-98) | 16.5 |

Ethoxyquin in this formulation is a common name for 1,2-dihydroxy-6-ethoxy-2,2,4-trimethylquinoline, an antioxidant.

The specific preparation of this formulation is prepared by admixing the components at 20° C.

The preparation of this formulation is useful when in water dispersion as a spray additive for animal and poultry feeds. Upon addition of this preparation to water, it immediately disperses to form a milkly dispersion stable for 30 minutes.

*Example 2*

This example illustrates another specific embodiment of an anhydrous, water dispersible, vitamin A preparation. This specific preparation is formulated to have a vitamin A potency of 100,000 U.S.P. units per gram.

This embodiment is formulated as follows:

| Components: | Parts by weight |
|---|---|
| All-trans vitamin A palmitate concentrate (potency is 1,600,000 U.S.P. units per gram) | 6.5 |
| Corn oil | 55.0 |
| Polyoxyethylene (20) sorbitan monooleate | 27.0 |
| Wintered distilled monoglycerides product derived from safflower oil (wintered Myverol Type 18-98) | 11.5 |

The preparation of this formulation is prepared merely by admixing the components at 20° C. The result is an anhydrous, clear oil solution.

This composition is also useful when dispersed in water as an additive for feeds and the like. When admixed with water it rapidly and readily disperses in water to form a dispersion which is stable for at least 30 minutes.

*Example 3*

This example illustrates still another embodiment of an anhydrous, water dispersible, vitamin A preparation of this invention. This embodiment is formulated to have a vitamin A potency of about 600,000 U.S.P. units per gram.

The embodiment is formulated as follows:

| Components: | Parts by weight |
|---|---|
| All-trans vitamin A palmitate concentrate (potency=1,600,000 U.S.P. units per gram) | 36.8 |
| Cottonseed oil | 27.5 |
| Polyoxyethylene (20) sorbitan monooleate | 25.0 |
| Distilled monoglycerides product derived from safflower oil (Myverol Type 18-98) | 10.7 |

The vitamin A preparation of this formulation is made by admixing the components at 20° C.

This vitamin A preparation is useful in aqueous dispersion as a feed supplement. It is added to the feed in an aqueous dispersion made by admixing this preparation and water at room temperature (20-25° C.), the ratio of the anhydrous preparation to water being, for example, 0.001 gram per liter of water.

*Example 4*

This example illustrates a specific embodiment of an anhydrous, water dispersible, vitamin E composition. This embodiment is formulated to have a vitamin E potency of 100,000 international units per pound.

The formulation of this embodiment is:

| Components: | Parts by weight |
|---|---|
| d-α-Tocopheryl acetate concentrate (potency is equivalent to 352 milligrams of d-α-tocopherol per gram) | 47 |
| Cottonseed oil | 23 |
| Polyoxyethylene (20) sorbitan monooleate | 21 |
| Wintered distilled monoglycerides produce derived from safflower oil (wintered Myverol Type 18-98) | 9 |

The vitamin E preparation of this formula is made by admixing the components at 20° C.

This preparation is useful as an animal feed supplement. It is employed for this use in aqueous dispersion. The aqueous dispersion is prepared by admixing the preparation with water at 20-25° C., the ratio of the preparation to the water being, for example, 0.001 gram per liter of water.

*Example 5*

This example illustrates another specific embodiment of an anhydrous, water dispersible, vitamin E preparation. This embodiment is formulated to have a vitamin E potency of 100,000 international units per pound.

The formulation of this embodiment is as follows:

| Components: | Parts by weight |
|---|---|
| d-α-Tocopheryl acetate concentrate (potency is equivalent to 352 milligrams d-α-tocopherol per gram) | 47.0 |
| Cottonseed oil | 48 |
| Polyoxyethylene (20) sorbitan monooleate | 3.5 |
| Distilled monoglycerides product deriver from safflower oil (Myverol Type 18-98) | 1.5 |

The embodiment of this formulation is made by admixing the components at room temperature (20-25° C.), whereby an anhydrous, clear oil solution is formed.

This embodiment is useful in aqueous dispersion as an animal feed supplement. The aqueous dispersion is prepared by admixing the vitamin E preparation with water at 20° C., the ratio of preparation to water being, for example 0.005 gram per liter of water.

*Example 6*

This example illustrates still another embodiment of an anhydrous, water dispersible, vitamin E preparation of this invention. This embodiment is so formulated so as to have a vitamin E potency of 800 international units per gram (about 365,000 international units per pound).

The formulation of the embodiment is:

| Components: | Parts by weight |
|---|---|
| d-α-Tocopheryl acetate (potency is equivalent to 1360 international units per gram) | 60 |
| Cottonseed oil | 10 |
| Polyoxyethylene (20) sorbitan monooleate | 21 |
| Distilled monoglycerides product derived from safflower oil (Myverol Type 18-98) | 9 |

The embodiment of this formulation is made by admixing the components at 20° C.

The embodiment of the formulation is useful in aqueous dispersion as an animal feed supplement. The aqueous dispersion is prepared by admixing, for example, 1 gram of the embodiment per liter of water at 20° C.

*Example 7*

This example illustrates yet another specific embodiment of an anhydrous, water dispersible, vitamin E preparation of this invention. This preparation is formulated to have a vitamin E potency of 100,000 international units per pound.

This composition is formulated as follows:

| Components: | Parts by weight |
|---|---|
| d-α-Tocopheryl acetate concentrate (potency is equivalent to 352 milligrams of d-α-tocopherol per gram) | 47 |
| Cottonseed oil | 18.4 |
| Polyoxyethylene (20) sorbitan monooleate | 24.2 |
| Monoolein | 10.4 |

The embodiment of this formulation is made by admixing the components at 20° C. The result is an anhydrous, clear oil solution.

This embodiment is useful in aqueous dispersion as a spray type, animal feed supplement. The aqueous dispersion is made by admixing the vitamin E preparation with water at 20° C., the amount of preparation admixed with water being, for example, 0.5 gram per liter of water.

*Example 8*

This example illustrate a specific embodiment of a multiple vitamin preparation of this invention. In particular, it illustrates a vitamins A and $D_2$ preparation having a vitamin A potency of 100,000 U.S.P. units per gram and a vitamin $D_2$ potency of 10,000 U.S.P. units per gram.

The formulation of this multiple vitamin preparation embodiment is:

| Components: | Parts by weight |
|---|---|
| All-trans vitamin A palmitate concentrate (potency is 1,600,000 U.S.P. units per gram) | 6.5 |
| Vitmain $D_2$ concentrate (potency is 1,000,000 U.S.P. units per gram) | 1.0 |
| Cottonseed oil | 37.5 |
| Polyoxyethylene (20) sorbitan monooleate | 38.5 |
| Distilled monoglycerides product derived from safflower oil (Myverol Type 18–98) | 16.5 |

The embodiment of this formulation is made by admixing the components at 20° C.

The specific preparation of this formulation is useful in aqueous dispersion as a spray type, animal feed supplement. The aqueous dispersion is prepared by admixing the specific preparation in water, the amount being, for example, 1 gram of the preparation for each liter of water.

*Example 9*

This example illustrates another specific embodiment of a multiple vitamin preparation of this invention. In particular, it illustrates a vitamins A, $D_2$ and E preparation having a vitamin A potency of 20,000 U.S.P. units per gram, a vitamin $D_2$ potency of 1200 U.S.P. units per gram and a vitamin E potency of 140 International Units per gram.

The formulation of this specific preparation is:

| Components: | Parts by weight |
|---|---|
| All-trans vitamin A palmitate concentrate (potency is 1,600,000 U.S.P. units per gram) | 1.3 |
| Vitamin $D_2$ concentrate (potency is 1,000,000 U.S.P. units per gram) | 0.12 |
| d-α-Tocopheryl acetate concentrate (potency is equivalent to 450 milligrams of d-α-tocopherol per gram) | 24.5 |
| Cottonseed oil | 44.08 |
| Polyoxyethylene (20) sorbitan monooleate | 21.0 |
| Distilled monoglycerides product derived from safflower oil (Myverol Type 18–98) | 9.0 |

The specific preparation of this formulation is made by admixing the components at room temperature (20–25° C.). The result is an anhydrous, clear oil preparation.

This specific preparation is useful in aqueous dispersion as a spray type, animal feed supplement. The aqueous dispersion is prepared by admixing the specific preparation with water at 20° C., the quantity of preparation being, for example, 1 gram per liter of water.

Thus, this invention provides a specific emulsifier composition. It provides an anhydrous, water dispersible, water insoluble vitamin preparation. This preparation is characterized by rapid water dispersibility and ability to form a cloudy aqueous dispersion which is stable for at least 30 minutes at all practical water concentrations.

Other embodiments, advantages and features will be apparent to those in the exercise of ordinary skill in the art after reading the foregoing disclosure. In this connection, while specific embodiments of this invention have been described in the disclosure in considerable detail, variations and modifications of these embodiments can be effected within the spirit and scope of the invention as described and claimed.

The embodiments of the invention in which an exclusive property or privilege is claimed are defined as follows:

1. An emulsifier composition consisting essentially of (A) polyoxyethylene (20) sorbitan monooleate and (B) a member of the group consisting of monoolein and a distilled monoglycerides product made by interesterification of glycerin with refined safflower oil followed by molecular distillation to concentrate the monoesters to at least 90% by weight of the product, the weight of ratio A to B being in a range from about 1.5:1 to about 4:1.

2. An emulsifier composition consisting essentially of (A) polyoxyethylene (20) sorbitan monooleate and (B) a member of the group consisting of monoolein and a distilled monoglycerides product made by interesterification of glycerin with refined safflower oil followed by molecular distillation to concentrate the monoesters to at least 90% by weight of the product, the weight ratio of A to B being in a range about 1.8:1 to about 3:1.

3. An anhydrous, water dispersible, vitamin preparation which consists essentially of (1) a fat-soluble vitamin-active oil at a concentration in a range from about 25 to about 95% by weight of the preparation, said oil having a triglyceride oil content at a concentration of at least about 5% by weight of said preparation, and (2) an emulsifier composition at a concentration in a range from about 5 to about 75% by weight of said preparation, said emulsifier composition consisting essentially of (A) polyoxyethylene (20) sorbitan monooleate and (B) a member of the group consisting of monoolein and a distilled monoglycerides product made by interesterification of glycerin with refined safflower oil followed by molecular distillation to concentrate the monoesters to at least 90% by weight of the product, the weight ratio of A to B being in a range from about 1.5:1 to about 4:1.

4. An anhydrous, water dispersible, vitamin preparation which consists essentially of (1) a fat-soluble vitamin-active oil at a concentration in a range from about 25 to about 95% by weight of the preparation, said oil having a triglyceride oil content at a concentration of at least about 5% by weight of said preparation, and (2) an emulsifier composition at a concentration in a range from about 5 to about 75% by weight of said preparation, said emulsifier composition consisting essentially of (A) polyoxyethylene (20) sorbitan monooleate and (B) a member of the group consisting of monoolein and a distilled monoglycerides product made by interesterification of glycerin with refined safflower oil followed by molecular distillation to concentrate the monoesters to at least 90% by weight of the product, the weight ratio of A to B being in a range from about 1.8:1 to about 3:1.

5. An hydrous, water dispersible, vitamin A preparation formulated as follows:

| Components: | Parts by weight |
|---|---|
| All-trans vitamin A palmitate concentrate (potency is 1,600,000 U.S.P. units per gram) | 6.5 |
| Cottonseed oil | 38.0 |
| Ethoxyquin | 0.5 |
| Polyoxyethylene (20) sorbitan monooleate | 38.5 |
| Distilled monoglycerides product made by interesterification of glycerin with refined safflower oil followed by molecular distillation to concentrate the monoesters to at least 90% by weight of the product | 16.5 |

6. An anhydrous, water dispersible, vitamin A preparation formulated as follows:

| Components: | Parts by weight |
|---|---|
| All-trans vitamin A palmitate concentrate (potency is 1,600,000 U.S.P. units per gram) | 6.5 |
| Corn oil | 55.0 |
| Polyoxyethylene (20) sorbitan monooleate | 27.0 |
| Wintered distilled monoglycerides product made by the interesterification of glycerin with refined safflower oil followed by molecular distillation to concentrate the esters to at least 90% by weight and then by the removal by wintering of more saturated fatty acid fractions | 11.5 |

7. An anhydrous, water dispersible, vitamin A preparation formulated as follows:

| Components: | Parts by weight |
|---|---|
| All-trans vitamin A palmitate concentrate (potency is 1,,600,000 U.S.P. units per gram) | 36.8 |
| Cottonseed oil | 27.5 |
| Polyoxyethylene (20) sorbitan monooleate | 25.0 |
| Distilled monoglycerides product made by the interestrification of glycerin with refined safflower oil followed by molecular distillation to concentrate the monoesters to at least 90% by weight of the product | 10.7 |

8. An anhydrous, water dispersible, vitamin E preparation formulated as follows:

| Components: | Parts by weight |
|---|---|
| d-α-Tocopheryl acetate concentrate (potency is equivalent to 352 milligrams d-α-tocopheral per gram) | 47 |
| Cottonseed oil | 23 |
| Polyoxyethylene (20) sorbitan monooleate | 21 |
| Wintered distilled monoglycerides product made by interesterification of glycerin with refined safflower oil followed by molecular distillation to concentrate the monoesters to at least 90% by weight of the product | 9 |

9. An anhydrous, water dispersible, vitamin E preparation formulated as follows:

| Components: | Parts by weight |
|---|---|
| d-α-Tocopheryl acetate concentrate (potency is equivalent to 352 milligrams of d-α-tocopherol per gram) | 47.0 |
| Cottonsed oil | 48 |
| Polyoxyethylene (20) sorbitan monooleate | 3.5 |
| Distilled monoglycerides product made by interesterification of glycerin with refined safflower oil followed by molecular distillation to concentrate the monoesters to at least 90% by weight of the product | 1.5 |

10. An anhydrous, water dispersible, vitamin E preparation formulated as follows:

| Components: | Parts by weight |
|---|---|
| d-α-Tocopheryl acetate (potency is equivalent to 1360 International Units per gram) | 60 |
| Cottonseed oil | 10 |
| Polyoxyethylene (20) sorbitan monooleate | 21 |
| Distilled monoglycerides product made by interesterification of glycerin with refined safflower oil followed by molecular distillation to concentrate the monoesters to at least 90% by weight of the product | 9 |

11. An anhydrous, water dispersible, vitamin E preparation formulated as follows:

| Components: | Parts by weight |
|---|---|
| d-α-Tocopheryl acetate concentrate (potency) is equivalent to 352 milligrams of d-α-tocopherol per gram) | 47 |
| Cottonseed oil | 18.4 |
| Polyoxyethylene (20) sorbitan monooleate | 24.2 |
| Monoolein | 10.4 |

12. An anhydrous, water dispersible, multiple vitamin preparation formulated as follows:

| Components: | Parts by weight |
|---|---|
| All-trans vitamin A palmitate concentrate (potency is 1,600,000 U.S.P. units per gram) | 6.5 |
| Vitamin $D_2$ concentrate (potency is 1,000,000 U.S.P. units per gram) | 1.0 |
| Cottonseed oil | 37.5 |
| Polyoxyethylene (20) sorbitan monooleate | 38.5 |
| Distilled monoglycerides product made by interesterification of glycerin with refined safflower oil followed by molecular distillation to concentrate the monoesters to at least 90% by weight of the product | 16.5 |

13. An anhydrous, water dispersible, multiple vitamin preparation formulated as follows:

| Components: | Parts by weight |
|---|---|
| All-trans vitamin A palmitate concentrate (potency is 1,600,000 U.S.P. units per gram) | 1.3 |
| Vitamin $D_2$ concentrate (potency is 1,000,000 U.S.P. units per gram) | 0.12 |
| d-α-Tocopheryl acetate concentrate (potency is equivalent to 450 milligrams of d-α-tocopherol per gram) | 24.5 |
| Cottonseed oil | 44.08 |
| Polyoxyethylene (20) sorbitan monooleate | 21.0 |
| Distilled monoglycerides product made by interesterification of glycerin with refined safflower oil followed by molecular distillation to concentrate the monoesters to at least 90% by weight of the product | 9.0 |

14. An aqueous dispersion consisting essentially of water and an anhydrous, water dispersible, vitamin preparation which consists essentially of (1) a fat-soluble vitamin-active oil at a concentration in a range from about 25 to about 95% by weight of the preparation, said oil having a triglyceride oil content at a concentration of at least about 5% by weight of said preparation, and (2) an emulsifier composition at a concentration in a range from about 5 to about 75% by weight of said preparation, said emulsifier composition consisting essentially of (A) polyoxyethylene (20) sorbitan monooleate and (B) a member of the group consisting of monoolein and a distilled monoglycerides product made by interesterification of glycerin with refined safflower oil followed by molecular distillation to concentrate the monoesters to at least 90% by weight of the product, the weight ratio of A to B being in a range from about 1.5:1 to about 4:1.

15. An aqueous dispersion consisting essentially of water and an anhydrous, water dispersible, vitamin preparation which consists essentially of (1) a fat-soluble vitamin-active oil at a concentration in a range from about 25 to about 95% by weight of the preparation, said oil having a triglyceride oil content at a concentration of at least about 5% by weight of said preparation, and (2) an emulsifier composition at a concentration in a range from about 5 to about 75% by weight of said preparation, said emulsifier composition consisting essentially of (A) polyoxyethylene (20) sorbitan monooleate and (B) a member of the group consisting of monoolein and a distilled monoglycerides product made by interesterification of glycerin with refined safflower oil followed by molecular distillation to concentrate the monoesters to at least 90% by weight of the product, the weight ratio of A to B being in a range from about 1.8:1 to about 3:1.

References Cited by the Examiner

UNITED STATES PATENTS 2,628,930  2/1953  Zentner _____ 167—81

OTHER REFERENCES

Remington, Practice of Pharmacy, Eleventh Edition, 1956, The Mack Publishing Co., Easton, Pa., pages 186, 190 and 191.

JULIAN S. LEVITT, *Primary Examiner.*

FRANK CACCIAPAGLIA, JR., LEWIS GOTTS, *Examiners.*